United States Patent [19]

Schaefer et al.

[11] 4,371,924
[45] Feb. 1, 1983

[54] COMPUTER SYSTEM APPARATUS FOR PREFETCHING DATA REQUESTED BY A PERIPHERAL DEVICE FROM MEMORY

[75] Inventors: Marcus J. Schaefer, Plano, Tex.; George F. DeTar, Jr., Westminster, Colo.

[73] Assignee: Rockwell International Corp., El Segundo, Calif.

[21] Appl. No.: 92,872

[22] Filed: Nov. 9, 1979

[51] Int. Cl.³ ............................................... G06F 7/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,825,904 | 7/1974 | Burk et al. | 364/200 |
| 3,928,857 | 12/1975 | Carter et al. | 364/200 |
| 4,086,629 | 4/1978 | Desyllas et al. | 364/200 |
| 4,095,269 | 6/1978 | Kawabe et al. | 364/200 |
| 4,179,737 | 12/1979 | Kim | 364/200 |

Primary Examiner—Gareth D. Shaw
Assistant Examiner—Eddie P. Chan
Attorney, Agent, or Firm—V. Lawrence Sewell; Howard R. Greenberg; H. Fredrick Hamann

[57] ABSTRACT

A computer system apparatus is disclosed for improved handling of requests by a peripheral device for data from memory. The apparatus serially receives multiple memory addresses from which data is requested by the peripheral device, and makes a determination that the received addresses form a sequence in memory. Upon this determination, the apparatus begins prefetching data from addresses anticipated to be received from the peripheral device, as an extension of the address sequence received. This prefetching of data, without waiting for an anticipated address to actually be received from the peripheral device, permits the apparatus of the invention to be simultaneously performing reads to memory and communication with the requesting peripheral device. This decreases the access time on the peripheral bus, providing increased bus rates and thereby improving computing throughput.

4 Claims, 8 Drawing Figures

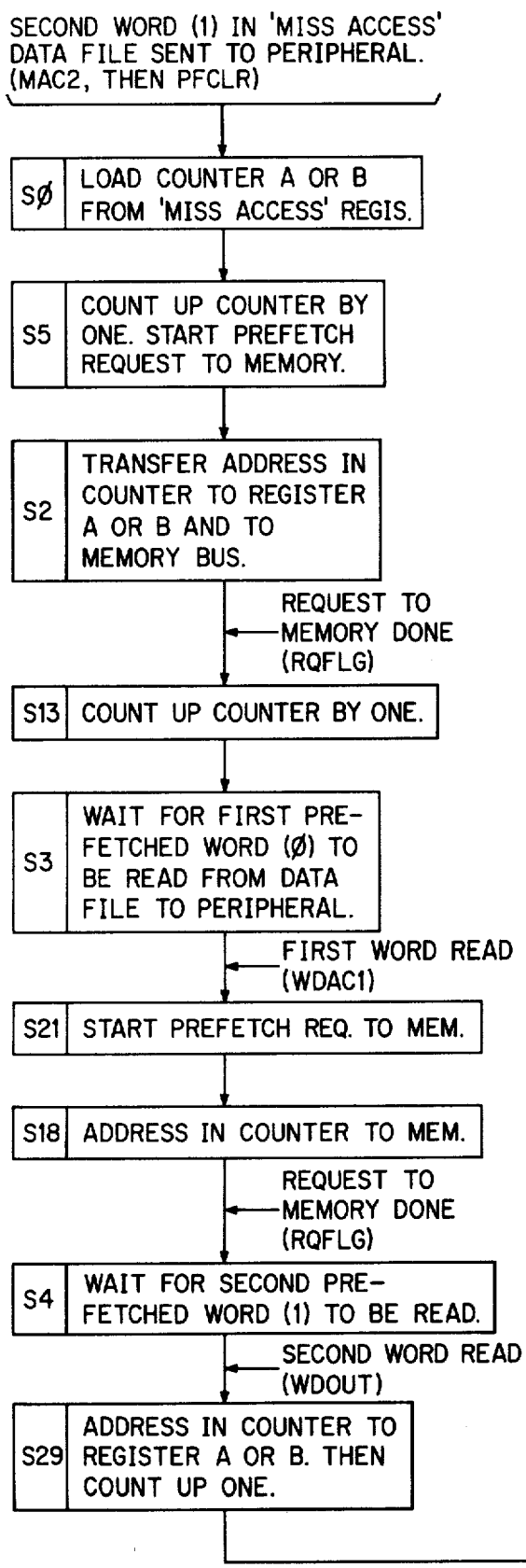
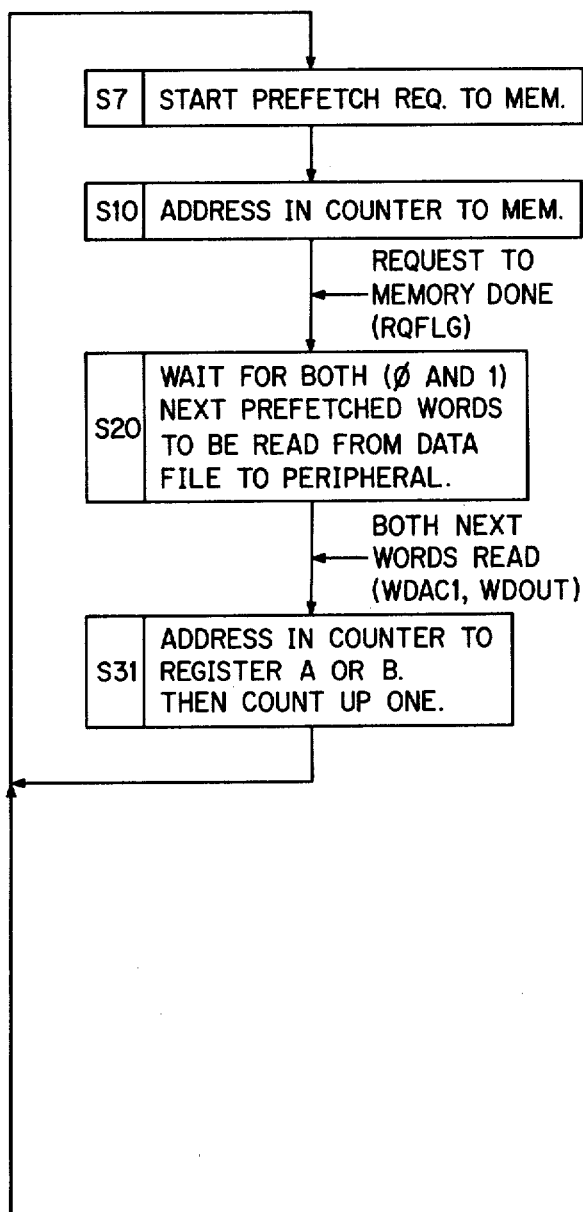
FIG. 4

STATE

S2   REQUEST TWO WORDS OF DATA FROM
     MEMORY ADDRESS MAAR+1

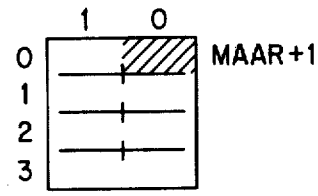

S3 → S21   SEND FIRST WORD OF MAAR+1 DATA
           TO PERIPHERAL

S18  REQUEST TWO WORDS OF DATA FROM
     MEMORY ADDRESS MAAR+2

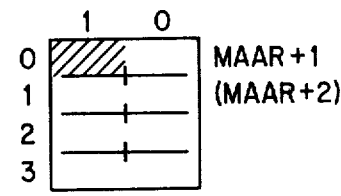

S4 → S29   SEND SECOND WORD OF MAAR+1 DATA
           TO PERIPHERAL

S10  REQUEST TWO WORDS OF DATA FROM
     MEMORY ADDRESS MAAR+3

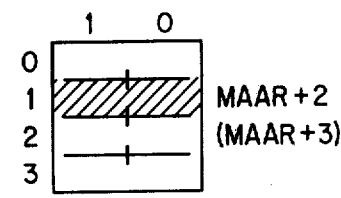

S20 → S31  SEND FIRST WORD, THEN SECOND WORD
           OF MAAR+2 DATA TO PERIPHERAL

[S10]'  REQUEST TWO WORDS OF DATA FROM
        MEMORY ADDRESS MAAR+4

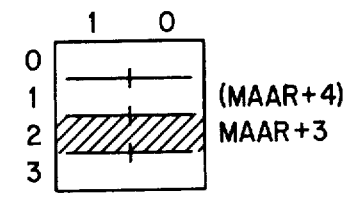

[S20 → S31]'  SEND FIRST WORD, THEN SECOND WORD
              OF MAAR+3 DATA TO PERIPHERAL

[S10]"  REQUEST TWO WORDS OF DATA FROM
        MEMORY ADDRESS MAAR+5

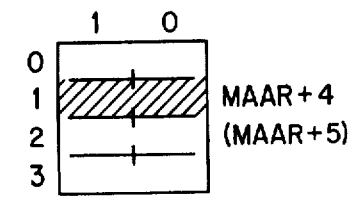

[S20 → S31]"  SEND FIRST WORD, THEN SECOND WORD
              OF MAAR+4 DATA TO PERIPHERAL

FIG. 5

COMPUTER SYSTEM APPARATUS FOR PREFETCHING DATA REQUESTED BY A PERIPHERAL DEVICE FROM MEMORY

BACKGROUND OF THE INVENTION

This invention relates to computer systems of the type wherein a peripheral device makes requests to memory for data, and more particularly to systems wherein multiple memory modules are communicated with by means of a bus and in which several peripheral devices are likewise interconnected by a bus.

In some computer systems, peripheral devices such as magnetic disc memory units make requests to memory for data. Conventionally, in the performance of a number of such requests, each data request is handled separately. The peripheral device generates the request, this is transmitted eventually to a memory module, a read is performed at the module, and then the data is transferred back through intervening hardware to the peripheral unit. After this processing has been completed for the data from a first address, it is reinitiated for the next address from which data is desired.

Often a peripheral device will request a number of data words from addresses which form a sequence in memory. This is because the data words form some set or group which was written into memory addresses one after another in sequence. It has been recognized in accordance with the present invention that it is advantageous to detect when requests from a peripheral are of this sequential form, so that a request for a second data word can be initiated, before all the processing accompanying a first request has been completed. This "prefetching" of data anticipated to be requested provides an advantage, when operations processing the first request can be performed simultaneously with some of the activities fulfilling the second request. For example, the time that is required to read data from a memory module for one request can be used in the fulfillment of other requests to transmit data or addresses back and forth between memory and the peripheral and for handling the addresses or data at the peripheral.

In some systems, a number of devices communicate with plural memory modules interconnected by a bus. In addition, a number of peripherals may communicate with other parts of the system by means of an interconnecting bus. In such systems, the transfer of addresses and data on the buses can become time consuming, particularly where several devices compete for control of a bus. It then becomes particularly advantageous to be able to perform memory reads, memory bus transfers and peripheral bus transfers in an overlapping fashion.

SUMMARY OF THE INVENTION

In accordance with the present invention, there is provided an improvement in a computer system of the type wherein a peripheral device makes requests for data from memory. The improved computer system serially receives from the peripheral device multiple memory addresses from which data is requested by the device. The system is capable of making a determination that a plurality of the addresses received serially form a subsequence of the sequence of addresses in memory. When this determination is made, the system prefetches data from a memory address anticipated to be received from the peripheral device, as an extension of the received subsequence, without waiting for the anticipated address to actually be received.

Thus, the computer system according to the invention can process a plurality of the memory requests from the peripheral device simultaneously. As a result, it is often possible to complete requests to a list of sequential memory addresses much faster than would be possible if the requests were handled only one at a time.

BRIEF DESCRIPTION OF THE DRAWINGS

FIG. 4 is a flow chart of the operation of a prefetch sequence controller in FIG. 1.

FIG. 5 is a diagram illustrating a sequence of prefetch operations and showing storage in a data file.

DESCRIPTION OF PREFERRED EMBODIMENT

Figure 1:
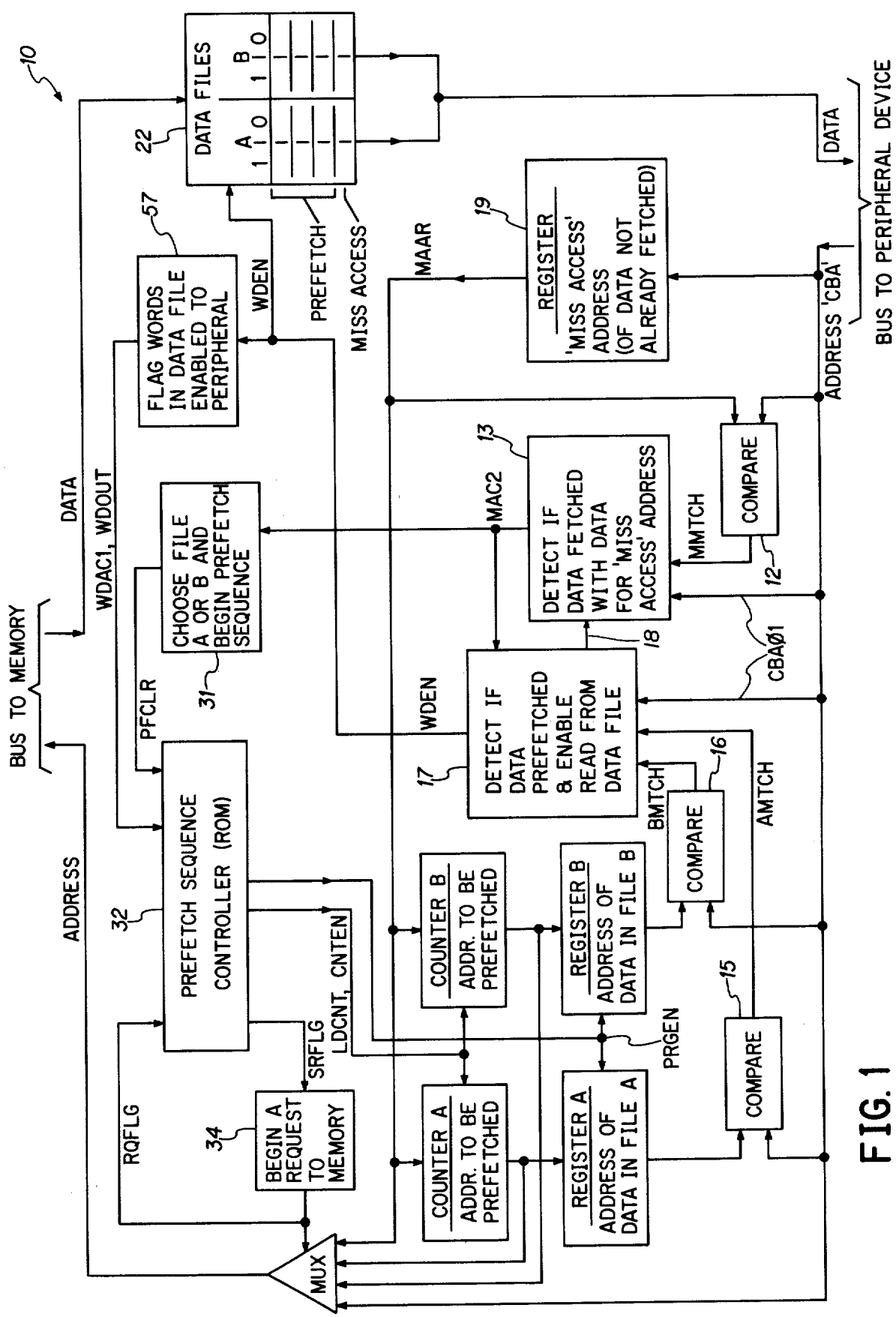
FIG. 1 is a block diagram of a computer system improvement according to the invention.

FIG. 1 shows a block diagram of a prefetching system according to the invention, indicated generally by the reference numeral 10. At the bottom of FIG. 1 are indicated connections transferring information to and from a peripheral. On the bus may be several peripheral devices. A type of peripheral device to which the present invention is particularly suited is a magnetic disc memory unit. A disc device sends on to the bus requests for data from memory addresses. The system of the invention processes these memory requests and, as shown at the top of FIG. 1, sends requests, each including an address, to memory. System 10 receives data back from memory and at the appropriate time sends the data back to the requesting device on the peripheral bus.

The improved operation provided by the system 10 deals with the following situation. It frequently happens that a peripheral device requests from memory a list of data words which have been stored together in sequential addresses in memory. The time required in the complete cycle of requesting data from memory and transferring it to the peripheral device can include the time required to generate the request at the device to transfer information to and from memory through various buses and bus interfaces including the peripheral bus and memory bus, to perform a read at a memory module, and to accept data back at the peripheral device. The simple approach is to perform all of the steps necessary to obtain one word before beginning the sequence of steps for the next word. However, in accordance with the present invention, it is recognized that one set of these steps can be performed while the other steps are in progress. The operations of transmitting on buses and through bus interfaces to memory, performing a read at a memory unit and transmitting back from memory can be performed while a previously read word is being transmitted on the peripheral bus to the requesting device and while a new request is being issued by the peripheral device and transmitted back (toward memory) on the peripheral bus. System 10 takes advantage of this situation by recognizing when addresses received on the bus from a peripheral device form a sequence in memory. Then system 10 begins fetching data from addresses next in the sequence, before the requests are actually received for this data from the peripheral device.

When a request for data from memory is received on the peripheral bus by system 10, the accompanying address, designated by the variable "CBA", is examined to see if the data requested has already been fetched from memory by system 10. This function is carried out by comparator 12 and circuit 13, along with comparators 15 and 16 and circuit 17. If these elements determine that the data has not already been fetched, then the data is fetched from memory, and the address for the request is stored in register 19. Thus, at any time, register 19 contains the last address for which data had not already been fetched. This address will be referred to herein as the "miss access" address. When the data from the miss access address is returned from memory, it is stored in a particular portion of data file 22, as indicated in FIG. 1.

Comparator 12 compares the address from the peripheral bus with the miss access address in register 19. The comparator 12 comprises four 4-bit compare circuits; hence, 16 bits can be compared. It is the higher order 16 bits of the address CBA and of the miss access address which are compared; the bit next in significance after the sixteen, bit number 1 of each address, is handled separately as described hereinafter.

Figure 2:
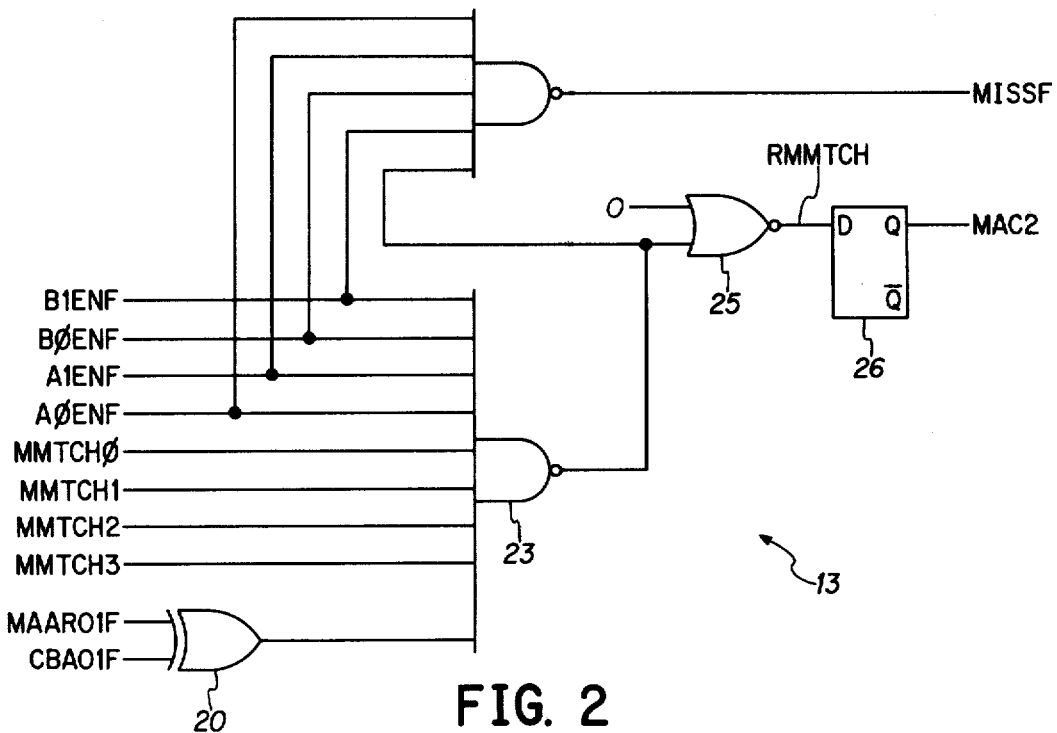
FIG. 2 is a logic diagram of a block in FIG. 1 for detecting if requested data has already been fetched.

Details of circuit 13 are shown in FIG. 2. The inputs from the four compare circuits of comparator 12 are MMTCH0-MMTCH3. These form inputs to NAND gate 23. If the higher order sixteen bits of the address CBA are all the same as comparable bits of the miss access address, then MMTCH0-MMTCH3 will all be 1's.

Exclusive OR circuit 20 receives as one input CBA01F, the false version of bit number 1 of the address CBA. The other input to exclusive OR circuit 20 is MAAR01F, the false version of bit number 1 of the miss access address register 19. The output of exclusive OR circuit 20 is a 1, when bit number 1 of address CBA is different from bit number 1 of the miss access address. Therefore, MMTCH0-MMTCH3 and the output of exclusive OR circuit 20 are all 1's when all the bits of address CBA and the miss access address are the same, except for bit number 1.

In a computer system embodiment discussed extensively herein, processors and peripheral devices with 16 bit data words employ memory modules which store 32 bit words. In this case, a first 16 bit word is stored in the first half of the 32 bits and a second 16 bit data word is stored in the other half. When a read is performed, the entire 32 bit doubleword is read from memory at an address corresponding to the higher order 16 bits of address CBA. Bit number 1 of address CBA is then used to designate which half of the 32 bit memory doubleword is required.

Accordingly, in a system which stores two 16 bit data words in a 32 bit memory doubleword, the inputs MMTCH0-MMTCH3 will all be 1's, when the address CBA and the miss access address are stored in the same doubleword. When the output of exclusive OR circuit 20 is a 1, then CBA and the miss access address are not the same, but are the two halves of the 32 bit memory doubleword.

The other inputs to circuit 13 of FIG. 2 are A0ENF, A1ENF, B0ENF and B1ENF. These are output from circuit 17, indicated by flow arrow 18, and are illustrated in detail in FIG. 6a and FIG. 6b. When A0ENF is 0, it indicates that the data requested from memory address CBA has already been fetched from memory and is in the A portion of data file 22. Specifically, it is in a portion of data file 22 corresponding to the "0" half of the 32 bit doubleword read from memory. When the variable A1ENF is 0, it indicates that a data word has been prefetched and is in the "1" half of the A file of data file 22. Likewise the functions B0ENF and B1ENF, when 0, indicate that the data has been prefetched and is available in one of the halves of the B portion of data file 22. When all of the variables A0ENF, A1ENF, B0ENF and B1ENF are 1's, this indicates that the address CBA from the peripheral bus is not an address from which data has been prefetched.

When all the inputs to NAND gate 23 are 1, causing a 0 at the output thereof, it means that the address CBA from the peripheral bus is half of a memory doubleword of which the miss access address is the other half, and that the data from CBA has not been prefetched. The output of NAND gate 23 is one input to NOR gate 25, the other input of which is a logical 0. So long as both inputs to NOR gate 25 are zero, the output RMMTCH thereof is 1. This sets flip-flop 26 so that the Q output thereof MAC2 becomes 1.

When MAC2 becomes set to 1, it means that the address CBA and the miss access address are the two halves of one memory doubleword. Through the operation of system 10, this doubleword has been fetched from memory in order to obtain the data from the miss access address. The doubleword, with the miss access data in one half thereof, has been stored in data file 22. Therefore, when MAC2 becomes 1, it is efficient to go to the doubleword stored in the miss access portion of data file 22 and transfer the other half of it to the requesting peripheral device as the data from address CBA. The data file 22 is enabled for reading by a portion of the circuit of FIG. 6a.

Figure 6A:
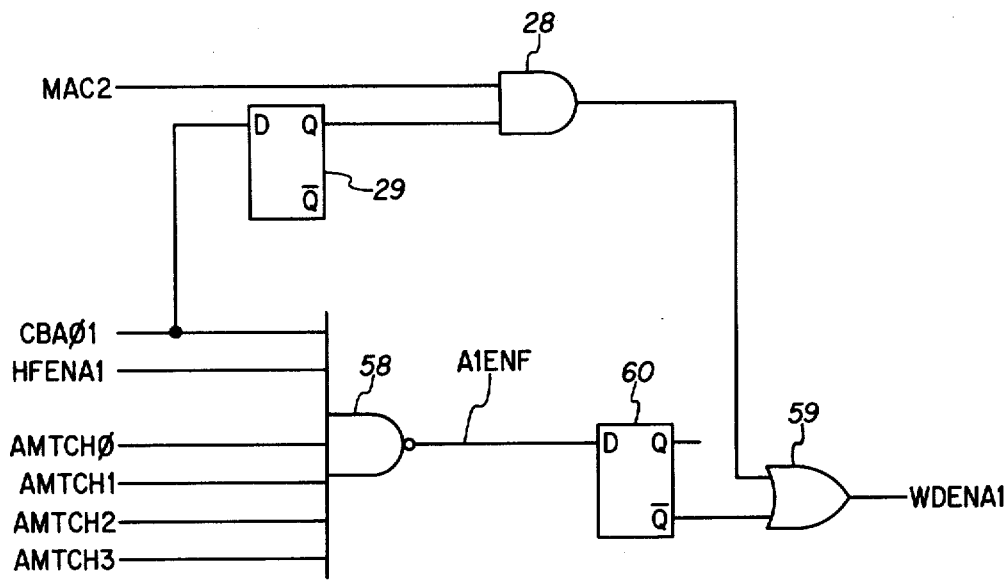
FIGS. 6a and 6b are logic diagrams of components of a block in FIG. 1 which detects if requested data has been prefetched.

In FIG. 6a, AND gate 28 receives as its inputs MAC2 and the Q output of a flip-flop 29. The D input of flip-flop 29 is CBA01, the number 1 bit of the address CBA from the peripheral bus. CBA01 will be a "1", setting flip-flop 29, when the "1" half of the memory doubleword is addressed. Therefore, when MAC2 is 1 and the Q output of the flip-flop 29 is 1, AND gate 28 causes the circuit output, WDENA1, to be 1. This in turn enables the "1" section of the "A" file of data file 22 to send a word on the bus to the peripheral device. Steering logic, not shown, selects the miss access data doubleword in data file 22 to have one half thereof thus transmitted.

When MAC2 becomes 1, it not only indicates that the requested data is already fetched from memory, but also that the last two words requested by the peripheral device are sequential in memory. At this point, it appears that a list of sequential data may be requested by the peripheral device. Accordingly, the preferred embodiment described in connection with FIGS. 1-7 begins at this point to prefetch data from the next addresses in the sequence before they are requested by the peripheral device. A preferred criterion for prefetching is that N successive requests occur, the addresses of which form a subsequence of the sequence of addresses in memory. It will be understood that the number N must be greater than 1 and should not be too large, in order to quickly begin benefitting from prefetching.

As shown in FIG. 1, the signal MAC2 is an input to a circuit 31 which initiates the prefetch sequence and chooses whether the prefetched data is to be stored in file A or B of data file 22. It is desirable to provide a plurality of data files, so that multiple peripheral devices can concurrently make memory requests through system 10. Thus, for the data files, A and B in the embodiment of FIG. 1, two peripheral devices can carry out prefetching, one using each of the data files.

Figure 3:
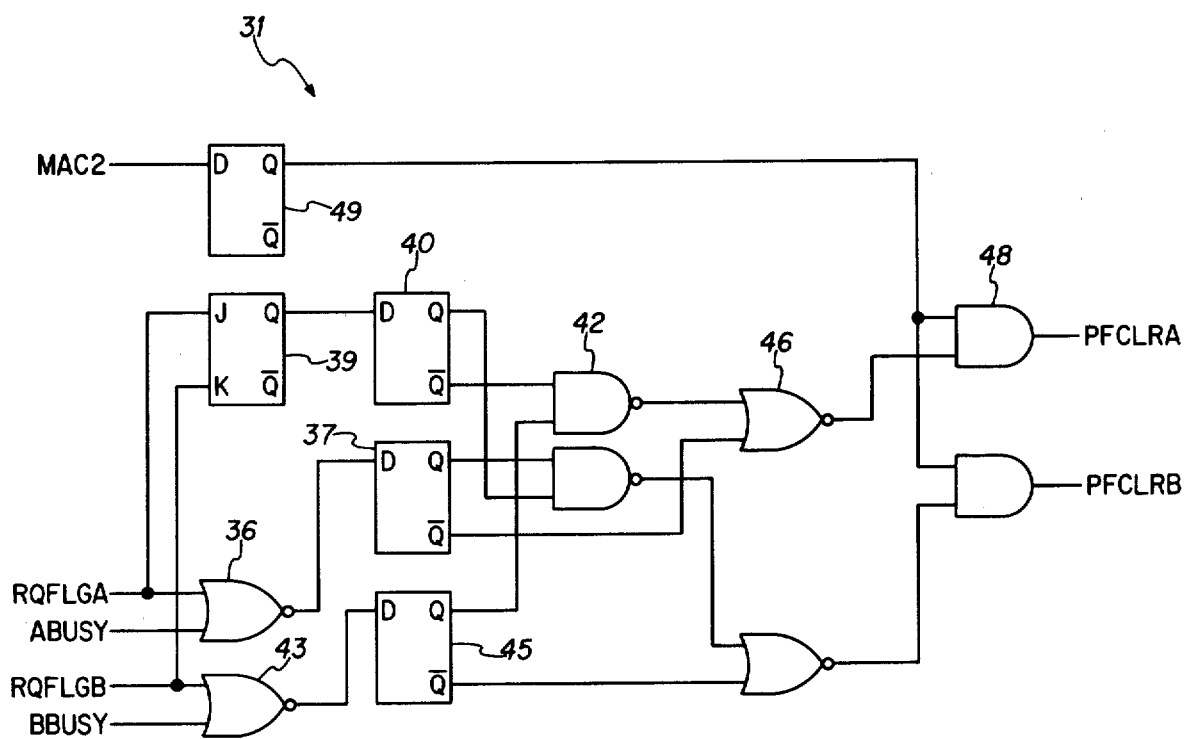
FIG. 3 is a logic diagram of a block in FIG. 1 for choosing a data file and beginning prefetching operations.

The details of circuit 31 are shown in FIG. 3. Its outputs are PFCLRA and PFCLRB which initiate prefetching for the A and B data files, respectively. For data file A, the input RQFLGA to circuit 31 is an output of circuit 34 (FIG. 1) which issues requests to memory for system 10. If there is in progress a prefetch request to memory for data file A, then RQFLGA will be a 1. If data file A is busy, then ABUSY, another input to circuit 31, will be a 1. The signals RQFLGB and BBUSY indicate similar states for data file B. If neither RQFLGA nor ABUSY are 1, then the output of NOR gate 36 is a 1, setting flip-flop 37 with its Q output signal equal to 1. If flip-flop 39 has last received a 1 from RQFLGA, then its output Q will be set to 1; if it has last received a 1 from RQFLGB, then the output Q will be 0. This latter condition causes flip-flop 39 to be 1 if the last memory request was for file A, and 0 if the last request was for file B. If data file A is the one least recently used in this respect, then output Q of flip-flop 39 will be a 0, and the complementary output $\overline{Q}$ of flip-flop 40 will be a 1. As a result, NAND gate 42 has a 1 at its input from flip-flop 40, under this condition. The other input of NAND gate 42 is a 1, when neither RQFLGB nor BBUSY are 1, causing NOR gate 43 to set flip-flop 45.

Thus, NAND gate 42 has a 0 at the output thereof, whenever RQFLGA was the least recently issued memory request, and when file B is neither busy nor is having a memory request issued. The NOR gate 46, which receives the output of gate 46, receives a 0 at its other input, from flip-flop 37, when file A is not busy and there is not a memory request being issued for file A. Under such conditions when both of its inputs are zero, NOR gate 46 issued a logical 1 to AND gate 48. When signal MAC2 from circuit 13 of FIG. 2 has set flip-flop 49, then AND gate 48 receives 1 at its other input, and its output, PFCLRA, becomes a 1.

It can be determined from a consideration of the operation described for circuit 31, that PFCLRA initiates the prefetch sequence for data file A, only when that file is the least recently used of the two files. Where there are two peripheral devices and system 10 has been storing prefetch data for one of them in, say, file A, then a new sequence of memory addresses received from either peripheral device will initiate prefetching with storage to be carried out in the other data file B. If the device which was having its prefetched data stored in file A resumes with further requests from addresses in the same sequence, prefetching will continue where it left off for file A.

OPERATION OF PREFETCH SEQUENCE CONTROLLER

FIG. 4 illustrates, by means of a flow chart, the prefetch sequence as it is controlled by prefetch sequence controller 32. Prefetch sequence controller 32 can be, for example, a programmed ROM or a programmable logic array. Some of the signals and variables which flag the occurrence of certain events are shown in parenthesis.

As indicated at the top of FIG. 4, the prefetch sequence is initiated when the address for the data request received from the peripheral bus corresponds to the second half of a memory doubleword already fetched in connection with the miss access address. The signal MAC2, as previously described, causes the data already fetched to be transferred to the peripheral bus. Signal MAC2 further causes the selection of data file A or B and the initiation of prefetching, as PFCLRA or PFCLRB presents a logical 1 to sequence controller 32. At this point, controller 32 enters state 0, in which it loads counter A (FIG. 1) or counter B, corresponding to file A or file B, respectively, with the 16 most significant bits of the address in the miss access register 19.

From state 0, controller 32 switches to state 5, in which it causes the appropriate counter A or B to count up by 1. In state 5, the controller also provides a signal SRFLG to circuit 34 (FIG. 1) to begin a request to memory. Controller 32 then switches to state 2, in which it clocks the address in counter A or B into the associated register A or B (FIG. 1) and out to the memory bus by means of a multiplexer 51. The address sent to memory comprises the sixteen most significant bits of the miss access address incremented by one; hence, it is the address of the next memory doubleword after the one including the miss access address. If the address received by system 10 from the peripheral device form a decreasing sequence, then the controller decrements the counters and points to the memory doubleword before the one which includes the miss access address.

When prefetch sequence controller 32 receives the signal RQFLGA or RQFLGB indicating that circuit 34 has initiated its request to memory, the controller switches to state 13. In this state, it causes the appropriate counter A or B to count up by 1. Then the controller 32 switches to state 3, where it waits for the first prefetched word to be read from the data file onto the peripheral bus in response to a request from the peripheral device.

When a request for data from memory is received by system 10 from the peripheral bus, it must be determined whether this data has been prefetched. This determination is made by comparators 15 and 16 and circuit 17. Comparator 15 compares the address from the peripheral device with the address in register A. The address in register A is the memory address of the oldest prefetched data in data file A, which has not been sent out on the peripheral bus. Comparator 16 makes a similar comparison for data file B.

Figure 6B:
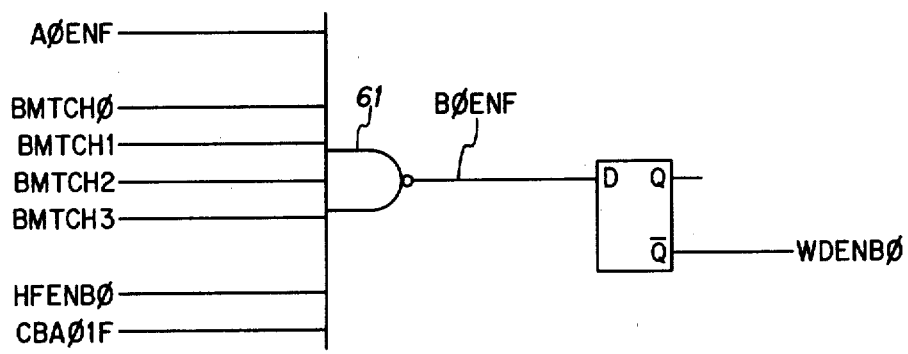

FIGS. 6a and 6b show two of four logic circuits which together form circuit 17. Each of compare circuits 15 and 16 includes four 4-bit comparators, and the outputs of compare circuit 15 are four bits AMTCH0-AMTCH3. These are inputs to the logic of FIG. 6a, which has an output WDENA1, and are also inputs to similar logic, not shown, which has an output WDENA0. If all of the inputs AMTCH0-AMTCH3 are 1, then the higher order 16 bits of the address received by system 10 from the peripheral bus are the same as the address in register A. If the number 1 bit of the received address, CBA01 is a 0, then the requested data is in the "first" or "0" half of the memory doubleword stored in data file A. If CBA01 is a 1, then it is the second or "1" word which is requested. The input HFENA1 to the logic of FIG. 6a is an enabling input from cricuit 57, to be described hereinafter in detail in connection with FIG. 7. When all these inputs to the logic of FIG. 6a are 1. then the output A1ENF of NAND gate 58 becomes 0, causing the complementary output $\bar{Q}$ of the flip-flop 60 to become 1. Through OR gate 59, $\bar{Q}$ drives output variable WDENA1. When WDENA1 becomes 1, it enables the output from the second half of the doublewords in the data file A to the requesting device by means of the peripheral bus. The similar circuit with output WDENA0 enables the output of the first half of data file A doublewords, when WDENA0 becomes 1.

The logic of FIG. 6b is for generating the output WDENB0 of circuit 17. Inputs to logic of FIG. 6b include BMTCH0-BMTCH3, the four outputs of comparator 16. These inputs also go to similar logic which generates a variable WDENB1. The generation of the signal WDENB0 is generated according to the same principles as WDENA1 in FIG. 6a. An exception is that NAND gate 61 of FIG. 6b receives as an input the variable A0ENF, comparable to A1ENF of FIG. 6a. If A0ENF were 0, this would generate a 1 in the corresponding variable WDENA0, enabling the output of the 0 words from the A file. Accordingly, when A0ENF is 0, it prevents NAND gate 61 from generating a 0 at the output thereof, so that WDENB0 does not become a 1. As a result, the 0 words of the B file are not enabled for output when the 0 words of the A file are enabled.

Thus while the controller 32 is waiting in state 3, comparators 15 and 16 and circuit 17 examine memory requests from the peripheral bus and send prefetched data from data files 22 back onto the peripheral bus in immediate response to the received request. The required prefetched word is enabled for output from data file 22 by means of outputs WDENA0, WDENA1, WDENB0 and WDENB1 from circuit 17.

Because of the time required for a read from memory, it can happen that data to be prefetched has been requested from memory but not yet received by system 10, at the time the peripheral device requests the data from system 10. At this point, the variables WDENA0-WDENB1 indicate that the data can be taken from a portion of the prefetch file, when the data arrives from memory. In addition to these variables, the system 10 can maintain a VALID bit for each 32 bit cell in data file 22, getting the bit when the data does arrive from memory. Then, only when the VALID bit is set will system 10 indicate to the peripheral device that the data is available to be sent to the device.

Figure 7:
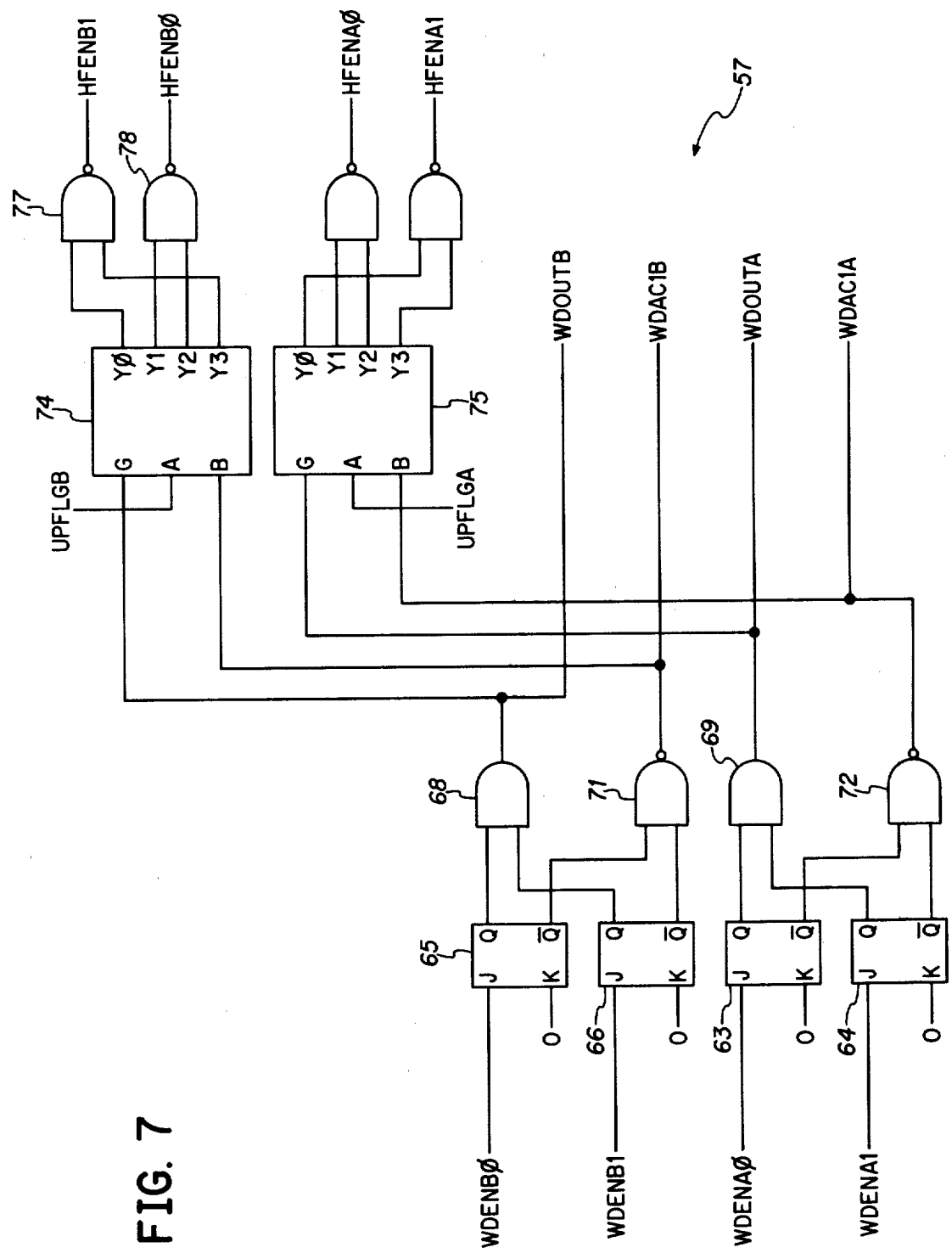
FIG. 7 is a logic diagram of a block in FIG. 1 which keeps track of words to be read from the data files.

The variables WDENA0, WDENA1, WDENB0 and WDENB1 from circuit 17 are also inputs to circuit 57, shown in detail in FIG. 7. These variables are connected to the J inputs of flip-flops 63-66 in FIG. 7. These flip-flops are cleared by controller 32 with the Q outputs low, before any words are read onto the peripheral bus from the prefetch data files. As a result, before a word is taken from either the "0" or "1" half of data file A or data file B, the outputs of AND gates 68 and 69, WDOUTB and WDOUTA, respectively, are both 0. When one of these variables WDOUTA or WDOUTB is 1, it indicates that both halves of a memory doubleword have been taken from the appropriate one of the data files A or B. In the state before either half is taken, the variables WDAC1B and WDAC1A, from NAND gates 71 and 72, respectively, are also 0. When either WDAC1A or WDAC1B is 1, it indicates that at least one half of a memory doubleword in one of the data files A or B has been enabled to be sent onto the combus.

Demultiplexers 74 and 75 of FIG. 7 can be, for example, Texas Instruments, Inc. 74LS139 integrated circuits. The signals UPFLGB and UPFLGA into the "A" inputs of the demultiplexers 74 and 75 have the value 1, if the addresses serially received from the peripheral bus form a sequence of increasing memory addresses. It is a feature of the system 10 that it can prefetch for a sequence of decreasing memory addresses by setting UPFLGA and UPFLGB to 0. For simplicity, the operation of circuit 57 will be described for that situation in which UPFLGA and UPFLGB are 1.

When neither half of the memory doublewords in one of the data files has been taken, then input G of demultiplexer 74 is 0, input A is 1 and input B is 0. This causes Y0, Y2 and Y3 to be 1 while Y1 is 0. NAND gates 77 and 78 receive the outputs Y0-Y3 of demultiplexer 74. When no words have been taken, the output HFENB1 of NAND gate 77 is 0, while HFENB0 from NAND gate 78 is 1. This sends a 1 to the logical circuit of FIG. 6b, permitting that logic to enable the "0" half of a doubleword in the B file, when the address CBA from the peripheral bus corresponds to prefetched data in the data file 22.

When the first half (37 0" word) of a doubleword is enabled for transmission onto the peripheral bus, WDENB0 becomes 1, setting flip-flop 65. The result is that WDAC1B becomes 1, indicating that at least one half the doubleword has been taken. Output WDOUTB remains equal to 0, indicating that the whole doubleword has not been taken yet. In this condition, signal HFENB becomes 1 and HFENB0 becomes 0. Signal HFENB1 is sent to circuit 17 in a manner comparable to the configuration of FIG. 6b and permits WDENB1 to become 1 whenever address CBA from the peripheral bus is the address of data in the prefetch file.

When finally the "1" word is taken from the B data file, WDENB1 has become 1 and set flip-flop 66. At this point, both WDOUTB and WDAC1B are 1. These signals, which go to prefetch sequence controller 32, thereby indicate that both halves of a word have been taken. At this point in the operation, HFENB1 becomes 0 and HFENB0 and becomes 0. Since these signals fit into the logic of circuit 17, as indicated in FIG. 6b, neither of the variables WDENB0 or WDENB1 can be set to 1 to enable a readout from the data files at this point. Flip-flop 65 and 66 must be reset by controller 32 for this to happen.

Referring again to FIG. 4, when the prefetch sequence controller 32 is in state 3, it is notified that the first word has been read from the data files 22, when WDAC1A or WDAC1B from circuit 57 becomes 1. At this point, controller 32 enters state 21, from which it starts another prefetch request to memory.

FIG. 5 illustrates the storage and retrieval of prefetched data in one of the sections of data file 22. The first entry in FIG. 5, at the top thereof, indicates that in state 2 of control 32, a memory doubleword is fetched from the doubleword address MAAR+1. MAAR is the miss access address. The next line indicates that the transition of the prefetch sequence controller 32 from state 3 to state 21 occurs when the first word of prefetched data, from address MAAR+1, is requested by a peripheral device and sent to the device. The diagram adjoining this second entry in FIG. 5 represents one of the sections A or B of data file 22. In the illustrated embodiment, the data file section comprises four doublewords, numbered 0-3 and each having a "0" portion and a "1" portion. In the embodiment illustrated, there is steering logic, not shown, which stores the first two prefetched words in doubleword number 0 of the file. When the first word is requested by the peripheral, it is taken from the "0" half of the doubleword 0 and sent on the peripheral bus to the requesting device. This word sent to the peripheral as indicated by shading in the diagram.

From state 21, controller 32 enters state 18, wherein the address from the appropriate counter A or counter B is sent to memory. Upon an indication by the variable RQFLG that the request to memory is done, counter 32 enters state 4. In that state it waits for the second prefetched word to be read. As shown in FIG. 5, the second word is taken from the "1" position of doubleword number 0 in the data file. When WDOUTA or WDOUTB becomes 1, indicating that the second word has been read, controller 32 enters state 29. In state 29, the address in counter A or B is transferred to the corresponding register A or B. Then the counter is incremented by 1.

When prefetch sequence controller 32 goes from state 29 to state 7, it enters a loop that is repeated for the duration of the prefetch operation. In state 7, controller 32 starts a request to memory. The controller then moves to state 10, in which the address from the appropriate counter A or B is transferred to memory as indicated in FIG. 5. The effect of this is to request two words of data from the memory doubleword address MAAR+3. Once the request to memory is done, control 32 moves to state 20, wherein it awaits the signals WDAC1 and WDOUT indicating that both the "0" and "1" words from the relevant data file have been enabled for transmission on the peripheral bus. FIG. 5 illustrates that the words thus sent to the peripheral bus would be those from the memory doubleword address MAAR+2, stored in doubleword number 1 of one of the data files 22.

After both of the words from doubleword address MAAR+2 have been read, controller 32 enters state 31 and transfers the address that is in the counter (MAAR+3) to register A or B as appropriate. Then controller 32 causes the corresponding counter A or B to be incremented by 1, to MAAR+4. Then the controller 32 loops back and reenters state 7.

FIG. 5 illustrates further operation of prefetching, as controller 32 enters state 10 for the second time, indicated in FIG. 5 by the designation [S10]'. The second time through state 10, a request is issued for two words of data from doubleword memory address MAAR+4, which address is in one of the counters A or B. When this data returns from memory, it will be stored in doubleword number 1 of the relevant data file, writing over the data from MAAR+2, previously sent on the peripheral bus. On the second pass through states 20 and 31, system 10 waits for requests from the peripheral bus for the first and then second word from doubleword memory address MAAR+3. These are sent by means of the peripheral bus to the requesting device, as the request is received by system 10.

On the second pass through state 10 of controller 32, as indicated by [S10]", two words of data are requested from the memory doubleword address MAAR+5. When this data arrives at system 10 from memory, it will be stored in doubleword number 2 of the data file, as indicated in FIG. 5. On the second pass through states 20 and 31, the first and second words from memory doubleword address MAAR+4 are sent to the peripheral device as requested.

A basic advantage in the operation of the system of the invention as described, is that system 10 can be communicating with memory at the same time that it is communicating with the requesting peripheral device, thus overlapping these functions and saving time. Of course, the longer it takes for system 10 to communicate with memory and perform a read on the one hand and to communicate with the peripheral device on the other, the greater advantage there is in overlapping these functions. In a system with multiple memory modules, multiple processors and multiple peripheral devices, there can be contention for the memory bus and for the peripheral bus, lengthening the time for an access to memory or for an access to a peripheral device. In this environment, the overlapping functions provided by the system of the invention are particularly advantageous.

We claim:

1. In a computer system, wherein a device on a peripheral bus makes requests for data from a memory, the improvement comprising:

means for serially receiving from said bus multiple addresses from which the data is requested by the device;

means for making a determination from said received addresses that a plurality of said addresses received serially from the bus form a subsequence of the sequence of addresses in said memory;

means for requesting and receiving selected data from memory, including means, responsive to said determination, for prefetching data from a memory address anticipated to be received from the bus as an extension of said subsequence, without waiting for said anticipated address to be received from the bus;

a data file;

means for storing data requested and received from said memory in said data file;

means for examining one of said serially received addresses to determine whether data from said examined address has been previously requested from said memory and received;

means responsive to said examining means for transferring, to the bus from the data file, data previously requested and received from the examined address; and means for determining when sufficient storage space becomes available in the data file to receive a further entry of data from said memory, and thereupon initiating said prefetching of data from said memory to fill the space which has become available.

2. The system of claim 1, wherein said improvement includes:

a plurality of said data files for the storage of data requested from said memory by said prefetching means, each of said files to be used for storing a different subsequence of addresses received from the bus; and means, responsive to the initiation of said prefetching of data, for choosing the least recently used of the data files for the storage of said data prefetched from said anticipated address.

3. The system of claim 1, wherein said means for requesting and receiving includes means for requesting and receiving a doubleword including in one word thereof the selected data corresponding to another one of said serially received addresses, received immediately preceding said examined address, and wherein said means for examining includes means for finding that the data for the examined address corresponds to the other half of said doubleword.

4. The system of claim 1 wherein said examining means includes means for comparing said examined address with the address of that data word in the data file which was least recently prefetched and was not transferred to the bus.

* * * * *